United States Patent

Lo

Patent Number: 5,661,504
Date of Patent: Aug. 26, 1997

[54] CURSOR CONTROL DEVICE CONSTRUCTION

[75] Inventor: Shun-Jung Lo, 5F, No. 2, Lane 364, Ti-Hua St., Sec. 2, Taipei, Taiwan

[73] Assignees: Abeam Technology Co., Ltd.; Shun-Jung Lo, both of Taipei, Taiwan

[21] Appl. No.: 568,422

[22] Filed: Dec. 6, 1995

[51] Int. Cl.$^6$ .................................................. G09G 5/08
[52] U.S. Cl. ........................ 345/164; 345/157; 345/163; 345/166
[58] Field of Search ................................. 345/157, 163, 345/164, 167, 166

[56] References Cited

U.S. PATENT DOCUMENTS

| | | | |
|---|---|---|---|
| 4,562,347 | 12/1985 | Hovey et al. | 345/163 |
| 5,457,479 | 10/1995 | Cheng | 345/163 |
| 5,517,211 | 5/1996 | Kwang-Chien | 345/166 |

Primary Examiner—Richard Hjerpe
Assistant Examiner—Kent Chang
Attorney, Agent, or Firm—Browdy & Neimark

[57] ABSTRACT

A cursor control device construction includes a body accommodating a circuit board and having a circular hole in a bottom side for containing a ball which may move freely therein. The body further has a pair of encoders, each of which consists of a wheel, a light source and a sensor. The wheel, light source and sensor may be secured on a securing seat which are provided with insert means at a bottom side thereof for insertion into corresponding holes in the circuit board. The securing seat further supports an idle wheel which is disposed between a roller at an end of a spindle of the wheel and the ball for transmitting rolling actions of the ball to the roller, so that when the ball rotates, the wheel is caused to synchronously rotate therewith. The arrangement of the idle wheel enables the spindle of the wheel to be located at a relatively higher position so that the diameter of the wheel may be increased to achieve precise reading of signals and the wheel may be mounted on the circuit board before tin soldering.

1 Claim, 7 Drawing Sheets

CURSOR CONTROL DEVICE CONSTRUCTION

BACKGROUND OF THE INVENTION (a) Field of the Invention

The present invention relates generally to a cursor control device construction, and more particularly to a cursor control device construction which facilitates mounting of the wheels, light sources and sensors on a circuit board and which permits a spindle of the wheel to be disposed at a relatively higher position to achieve precise reading of signals and to enable the wheel to be mounted on the circuit board prior to tin soldering.

(b) Description of the Prior Art

Conventional cursor control devices may be generally classified into three main types, namely, mechanical, optical and semi-optical.

In Semi-optical cursor control devices, the construction generally includes a body containing a circuit board therein and having a hole in a bottom side thereof for mounting of a ball which may roll freely therein. The body also accommodates a couple of encoders, each including a wheel which has a spindle extending in the direction of the ball, the spindle being provided with a roller which is in a frictional relationship with the ball, such that the wheel may rotate synchronously therewith. The wheel is provided with a light source and a sensor on both sides. The light emitted by the light source is just perpendicular to the spindle, and the sensor is disposed in the proximity of the periphery of the wheel so as to receive light passing via the periphery of the wheel. When the wheel rotates, some of the light emitted by the light source will be blocked by the wheel while some will pass via the periphery thereof to reach the sensor. These two conditions may be respectively represented by 0 and 1. When the wheel performs continuous rotation (whether clockwisely or counter-clockwisely), the following four signals will be obtained: (1, 1), (0, 1), (0, 0) and (1, 0). After undergoing conversion by means of the circuit board, these signals may control a cursor to move across the screen of a display. The two encoders are provided to respectively control the cursor to move across the screen horizontally and vertically, or in any other direction.

However, since the roller at one end of the spindle of the wheel rubs against the ball so that the ball and the wheel may synchronously rotate, the spindle has to be maintained at a certain height in order that the roller may always be in contact with the ball within a suitable extent. In other words, the wheel may have a lower rim thereof in contact with the circuit board below when mounted thereon. Therefore, the wheel cannot be mounted on the circuit board before the circuit board has undergone tin soldering since the wheel, due to its material and its position on the circuit board, may be easily damaged during the process. Besides, as the spindle of the wheel has to be maintained at a certain height, the diameter of the wheel is restricted and cannot be increased as desired. If the diameter of the wheel is prolonged, the wheel will certainly have the lower rim thereof touching the body. However as reading of signals may become more precise with the increase of the diameter of the wheel, it is imperative to find a solution to solve the above-mentioned problem.

Furthermore, the relative relationship among the wheels, light sources, and sensors will greatly affect the precision of signal reading. If these components are not properly mounted and positioned on the body of the cursor control device, signal reading will be defective or will even fail. But in the prior art, these components are individually welded to the circuit board directly so that it is necessary to adjust their position to ensure that they are properly positioned on the circuit board, which is very inconvenient and time-consumptive.

SUMMARY OF THE INVENTION

Accordingly, a primary object of the present invention is to provide a cursor control device construction wherein a wheel has a larger diameter and a spindle of the wheel may be arranged at a relatively higher position to permit precise reading of signals and to enable the wheel to be disposed above a circuit board and to be mounted on the circuit board before the circuit board is subjected to tin welding.

Another object of the present invention is to provide a cursor control device construction wherein the wheels, light sources and sensors may be conveniently land speedily mounted and positioned on the circuit board without the need for adjustment as in the prior art.

To achieve the above-mentioned objects, the cursor control device construction according to the invention essentially comprises a pair of encoders, each of which consists of a securing seat with a plurality of mountings for supporting a wheel and a couple positioning slots for securing a light source and a sensor, so that the wheel, light source and sensor may be mounted on the securing seat before the securing seat is mounted onto a circuit board by means of insert means which are inserted into corresponding holes in the circuit board. The securing seat further supports an idle wheel which is located intermediate a roller at one end of a spindle of the wheel and the ball for transmitting rolling actions of the ball to the roller so that the wheel may synchronously rotate with the ball. The provision of the idle wheel enables the spindle of the wheel to be located at a relatively higher position so that the diameter of the wheel may be increased to achieve precise reading of signals and the wheel may be mounted on the circuit board prior to tin welding.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
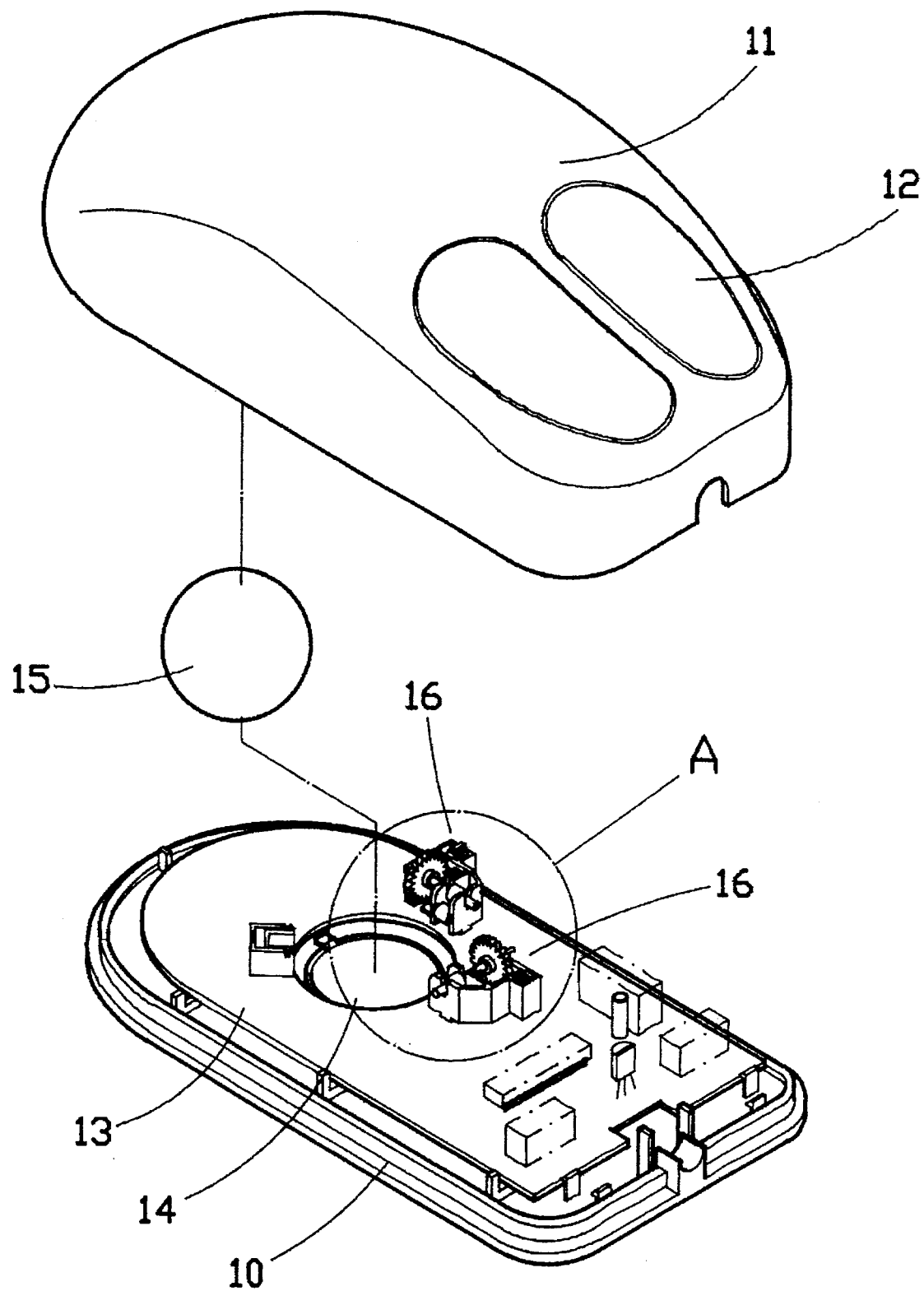
FIG. 1 is a perspective view of the cursor control device construction according to the present invention in an assembled state.
Figure 1A:
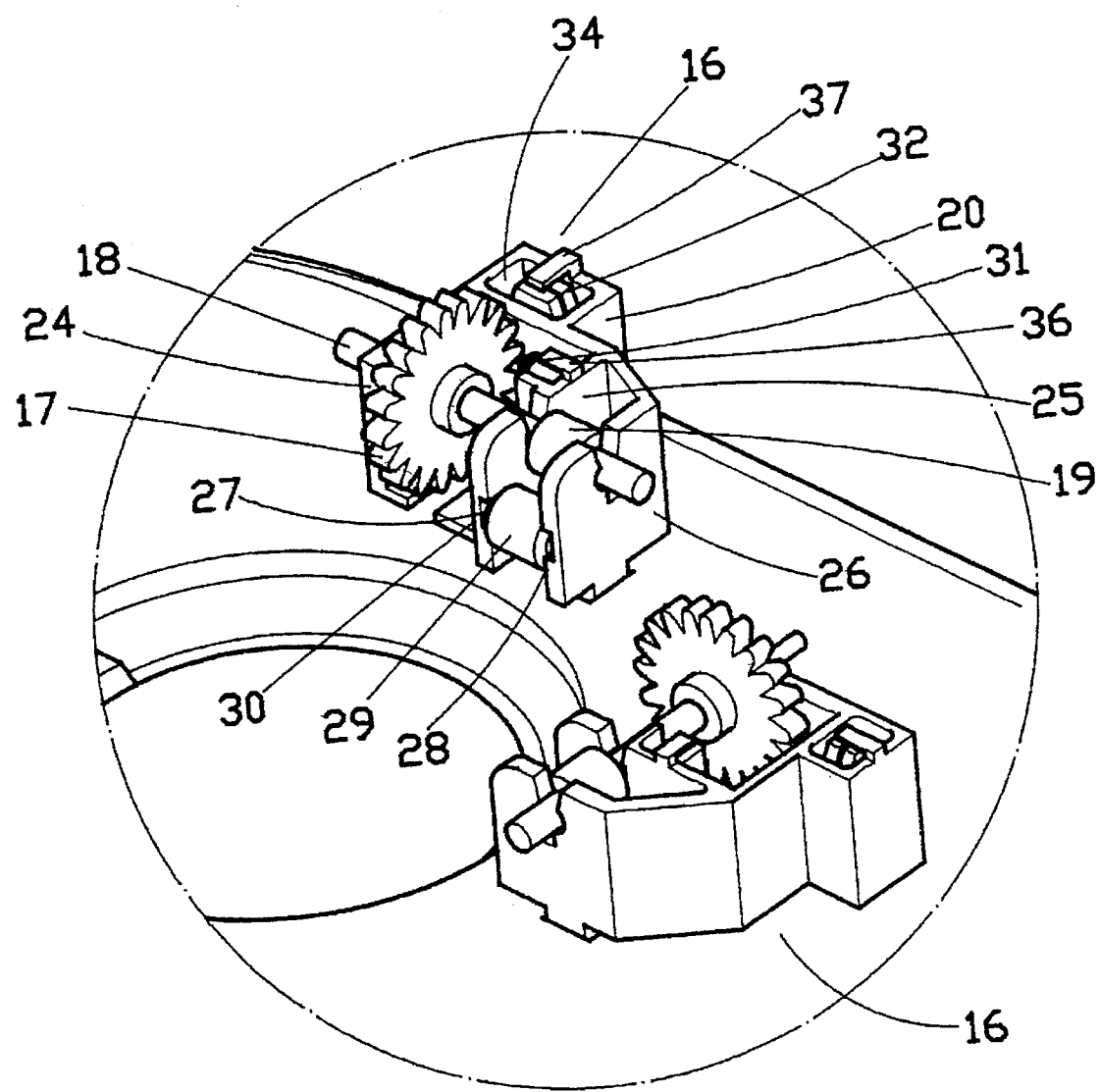
FIG. 1A is an enlarged view of part A of FIG. 1.
Figure 2:
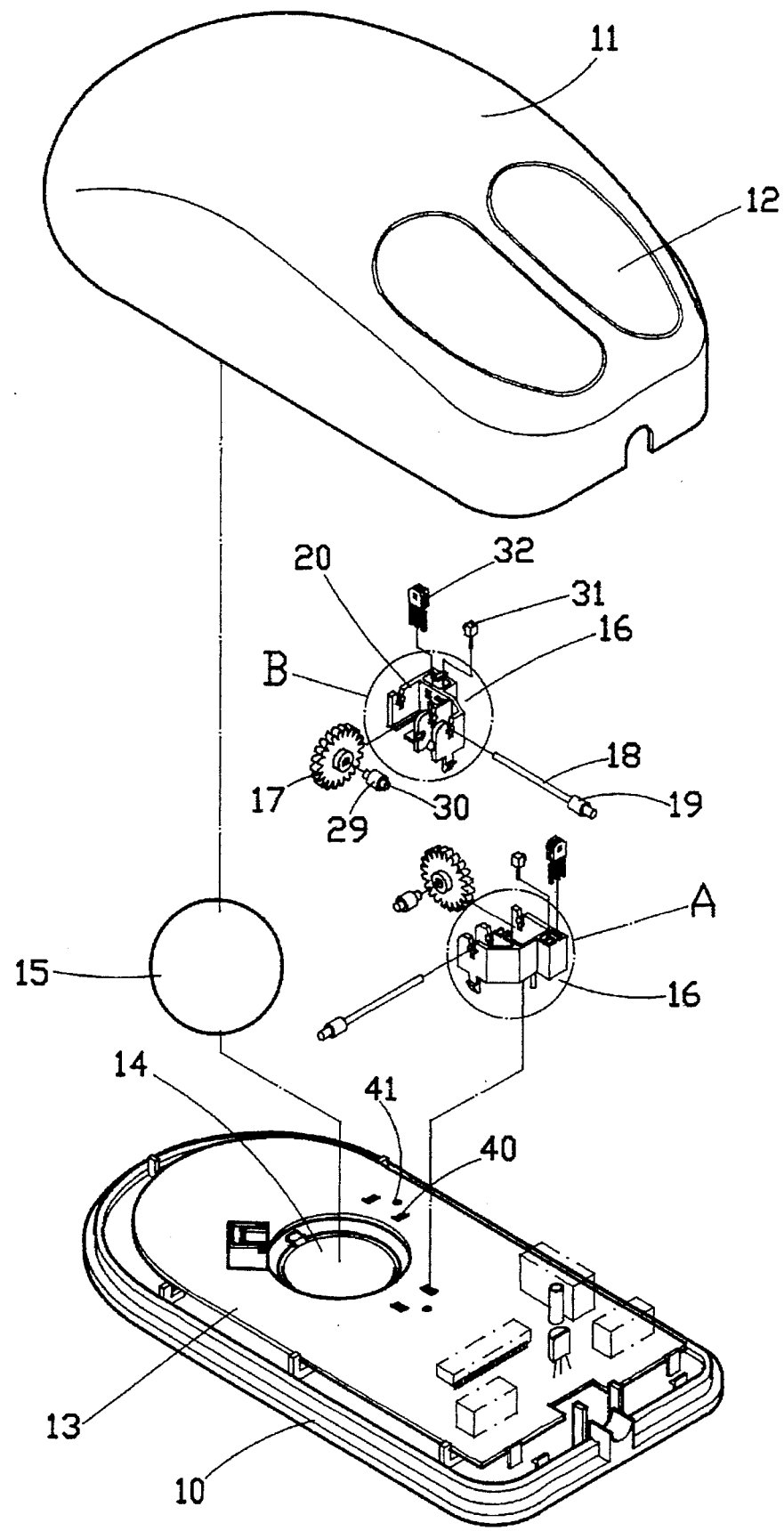
FIG. 2 is a perspective exploded view of the present invention.
Figure 2A:
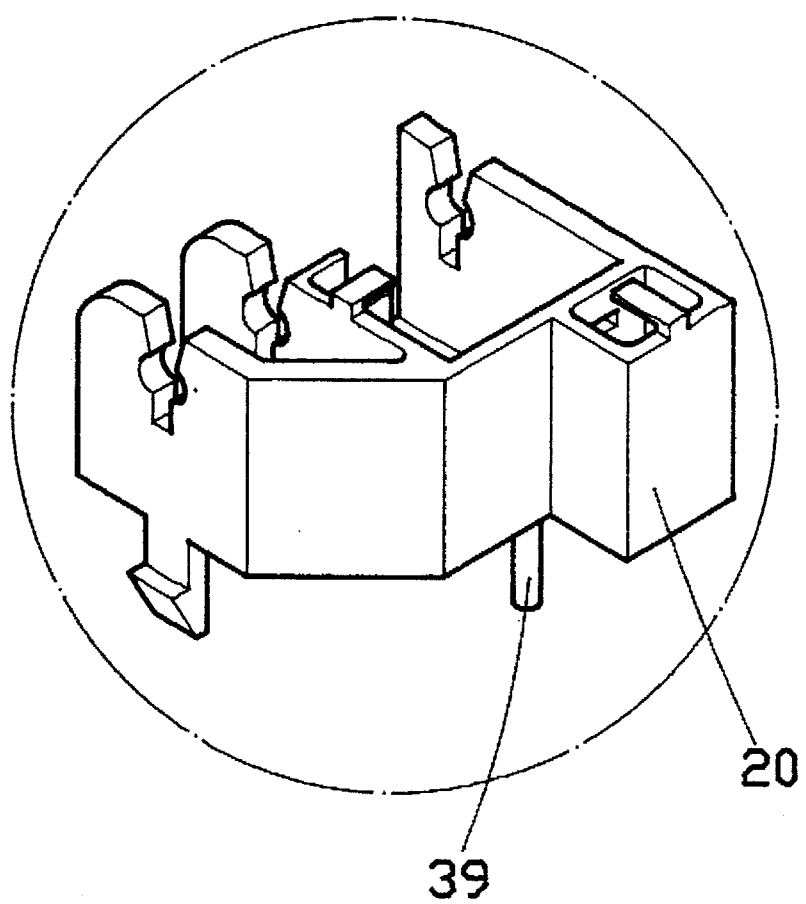
FIG. 2A is an enlarged view of part A of FIG. 2.
Figure 2B:
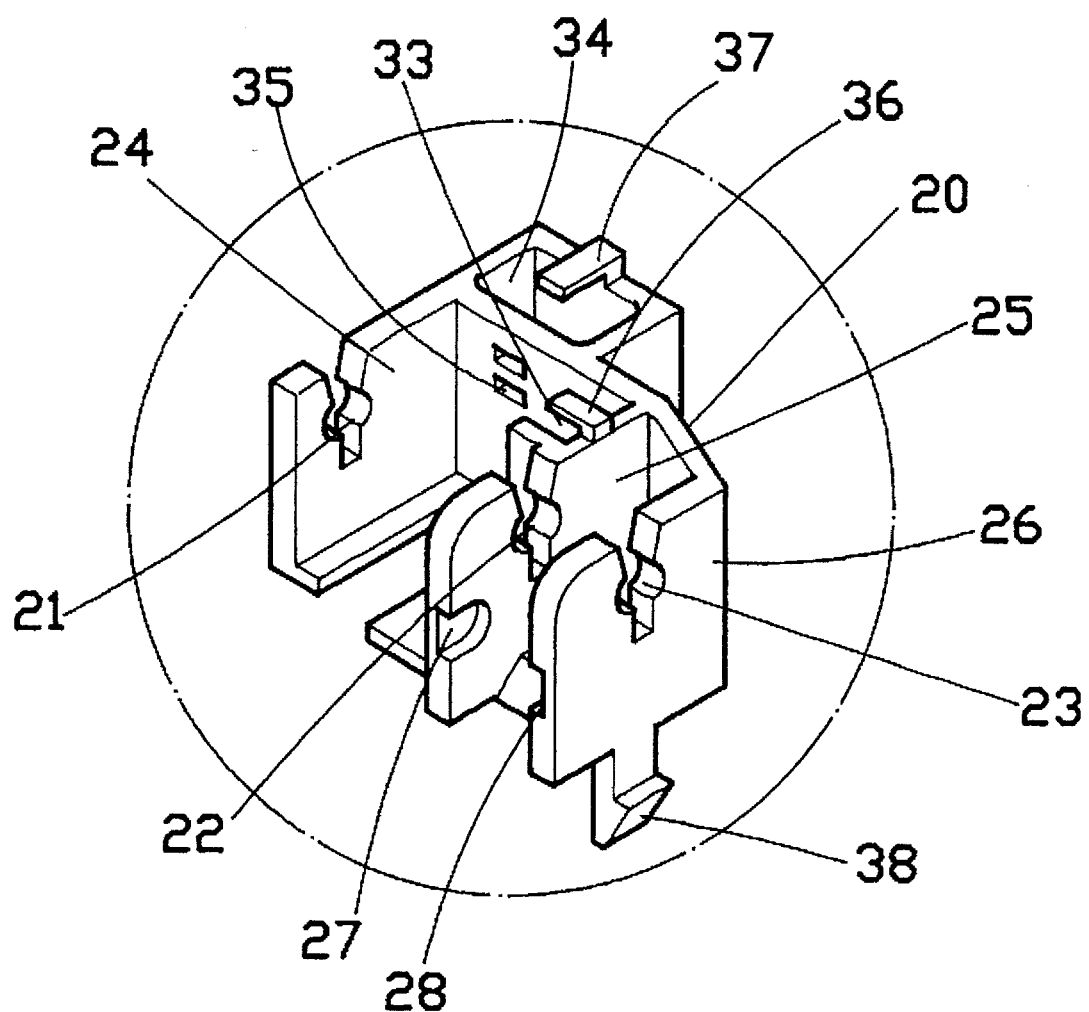
FIG. 2B is an enlarged view of part B of FIG. 2.

With reference to FIGS. 1 and 2, the cursor control device construction according to the present invention essentially comprises a body 10, a cap 11 having a plurality of push buttons 12 for sealing the interior of the body 10, and a circuit board 13 accommodated within the body 10. The body 10 further has a circular hole 14 formed in a bottom side thereof for accommodating a ball 15, which may roll freely within the hole 14.

Figure 3:
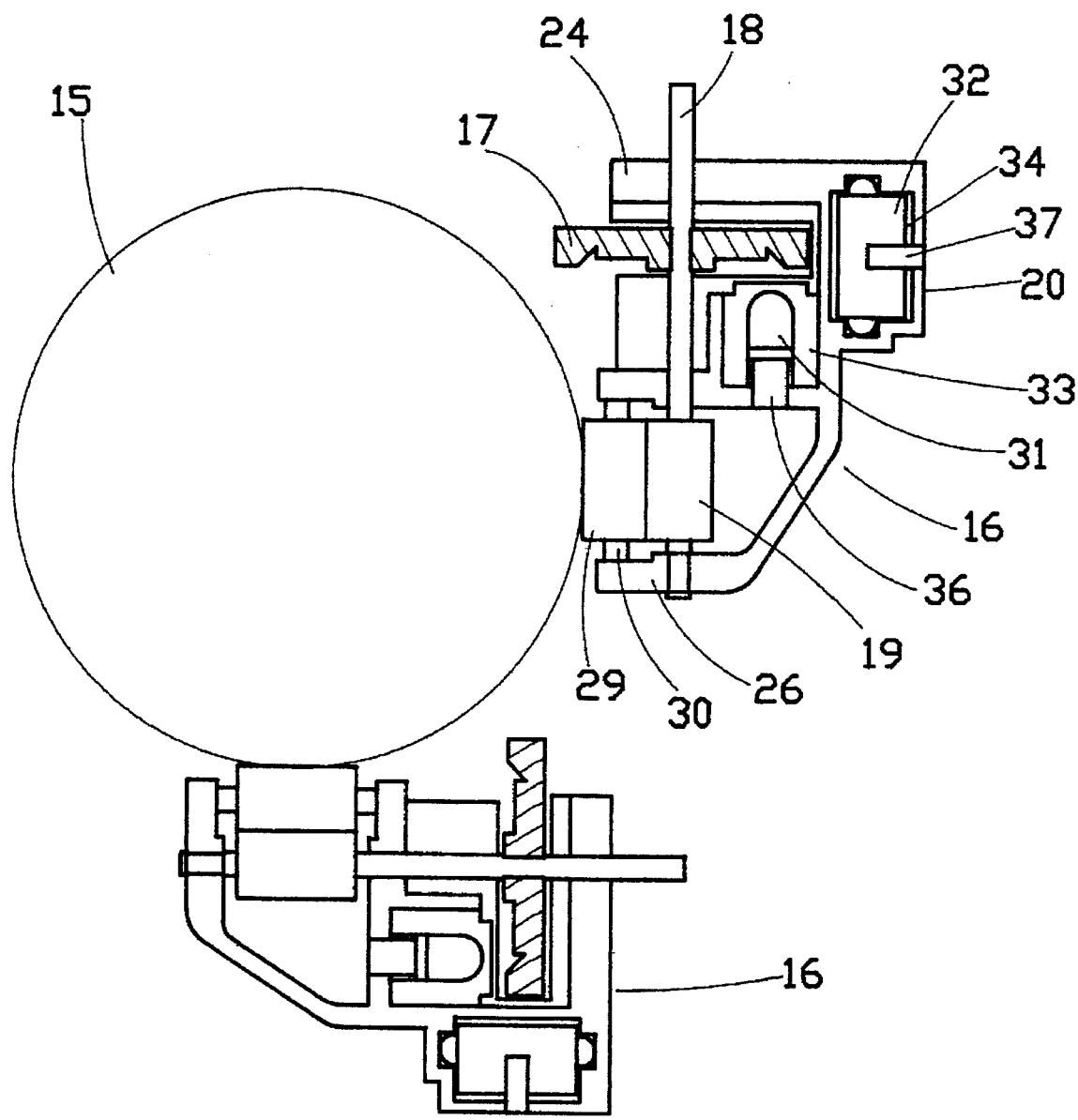
FIG. 3 is a top view of the encoders and a ball of the cursor control device construction according to the present invention.
Figure 4:
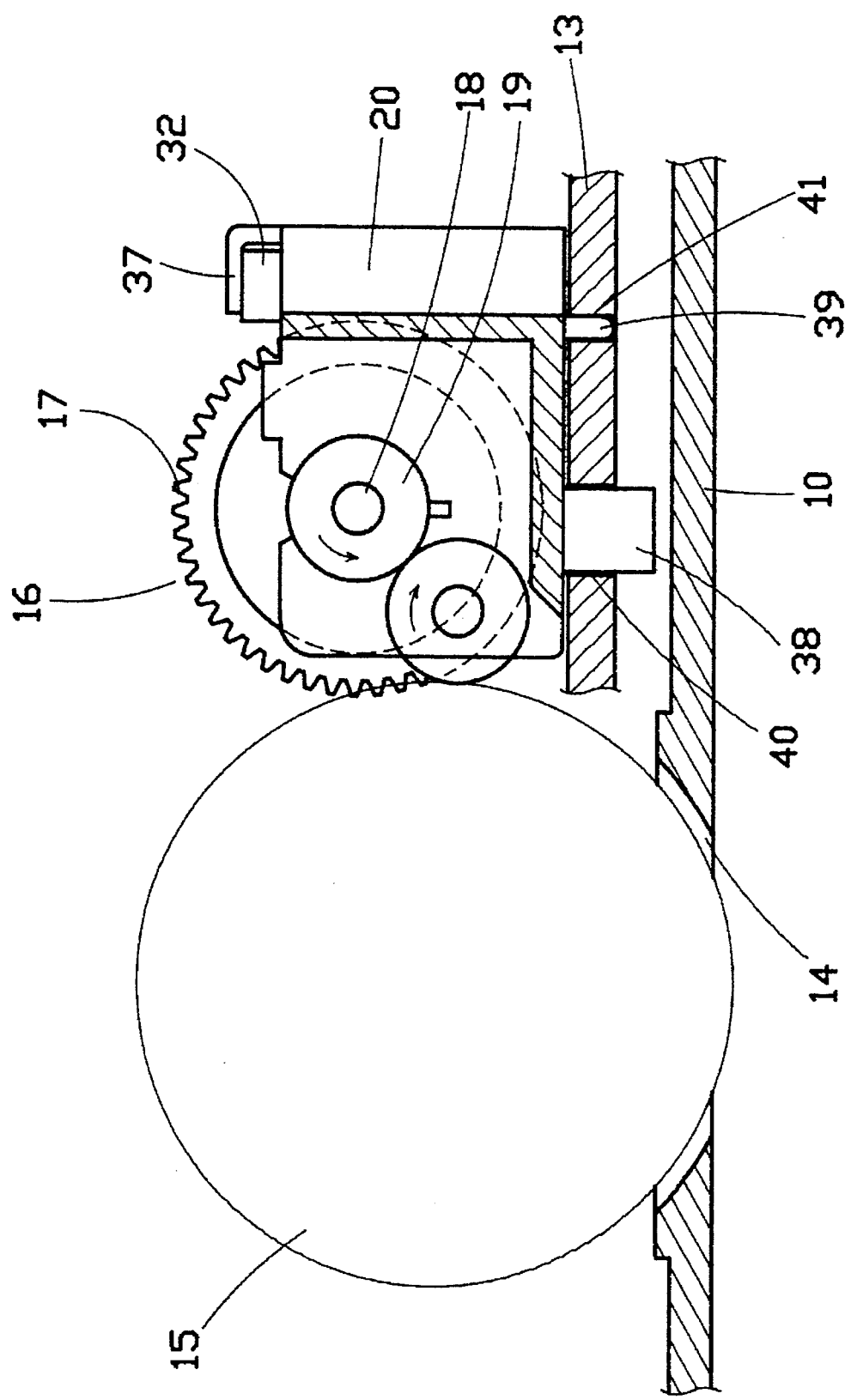
FIG. 4 is a side view of the encoders and the ball of the present invention.

The body 10 is provided with a pair of encoders 16. Each encoder 16 includes a wheel 17 having a spindle 18 extending in the direction of the ball 15, the spindle 18 having one end thereof fixedly provided with a roller 19. A securing seat 20 is disposed below the wheel 17 and has a plurality of plate-like mountings 24, 25, 26 respectively having slots 21, 22 and 23 for pivotally supporting the spindle 18, such that the wheel 17 may be disposed beside an inner side of the mounting 24 and the roller 19 maybe disposed intermediate the mountings 25 and 26. The mountings 25 and 26 are further respectively provided with individual notches 27, 28 in a vertical side thereof at a same elevation. An idle wheel 29 is disposed at a position lower than the spindle 19, with a spindle 30 at both ends thereof pivotally supported by the notches 27, 28. The idle wheel 29 is located between the roller 19 and the ball 15 and is in contact with both the roller 19 and the ball 15, so that the idle wheel 29 may transmit the rolling action of the ball 15 to the roller 19 (see FIGS. 3 and 4).

A light source 31 (such as an LED) and a sensor 32 are individually disposed on both sides of the wheel 17. The light source 31 and the sensor 32 are respectively inserted into positioning slots 33 and 34 of the securing seat 20. Two through holes 35 are formed in one side of the positioning slot 34 to allow light emitted from the light source 31 to reach the sensor 32 via the wheel 17. The positioning slots 33 and 34 have individual positioning plates 36 and 37 at an upper end thereof for positioning the light source 31 and the sensor 32 respectively.

The securing seat 20 has at least two hook-like lugs 38 and a positioning pin 39 projecting from a bottom side thereof. The wheel 17, light source 31 and sensor 32 are positioned properly on the securing seat 20 before the securing seat 20 is mounted onto the circuit board 13 by means of the lugs 38 and positioning pin 39 which are individually inserted into insert holes 40 and a positioning hole 41 correspondingly formed in the circuit board 13.

The light source 31 is disposed such that its light is just perpendicular to the wheel 17, and the sensor 32 is located near the periphery of the wheel 17 for receiving the light emitted by the light source 31 via the periphery of the wheel 17. When the wheel 17 rotates, some of the light emitted by the light source 31 will be blocked by the wheel 17 while some will pass via the periphery thereof to reach the sensor 32. These two conditions may be respectively represented by 0 and 1. Therefore, when the wheel 17 performs continuous rotation (whether clockwisely or counter-clockwisely), four signals may be obtained: (1, 1), (0, 1), (0, 0) and (1, 0). These signals are being converted via the circuit board 13 to control the movement of a cursor. Since there are provided two encoders 16, they may respectively control the horizontal and vertical movements of the cursor, which may move in whatever direction across the screen.

The arrangement of the idle wheel 29 is to enable the spindle 18 of the wheel 17 to be disposed at a relatively higher position so that the diameter of the wheel 17 may be increased to achieve precise reading of signals. In addition, the wheel 17 may be raised above the circuit board 13 so that it may be mounted on the circuit board 13 before the Circuit board 13 undergoes tin soldering. Furthermore, the wheel 17, light source 3 and sensor 32 may be fitted on the securing seat first before the securing seat 32 is assembled to the circuit board 13, thus achieving easy assembly and eliminating the need for adjustment as in the prior art.

Although the present invention has been illustrated and described with reference to the preferred embodiment thereof, it should be understood that it is in no way limited to the details of such embodiment but is capable of numerous modifications within the scope of the appended claims.

What is claimed is:

1. A cursor control device construction comprising:

a body having a cap with a plurality of push buttons locked to an upper side thereof, said body accommodating therein a circuit board and having a circular hole in a bottom side thereof for accommodating a ball, said body further having a pair of encoders, each of said encoders including a wheel with a spindle having one end thereof fixedly provided with a roller, a securing seat being disposed below said wheel, said securing seat having a plurality of plate-like mountings for supporting said spindle of said wheel, said mountings further supporting an idle wheel at a position lower than that of said roller, said idle wheel being disposed intermediate said roller and said ball and being in contact with both of said roller and said ball for transmitting rolling actions of said ball to said roller, a light source and a sensor being respectively disposed on both sides of said wheel and being secured in a couple of positioning slots formed in said securing seat, which has a plurality of hook-like lugs and a positioning pin projecting from a bottom side thereof, said lugs and said positioning pin being inserted into a plurality of insert holes and a positioning hole correspondingly formed in said circuit board after said wheel, said light source and said sensor are positioned on said securing seat.

* * * * *